US005599157A

United States Patent [19]
Ellington

[11] Patent Number: 5,599,157
[45] Date of Patent: Feb. 4, 1997

[54] CENTER-LOADING HARVESTER

[76] Inventor: Robert Ellington, 3334 U.S. Hwy 27 S., Lake Wales, Fla. 33853-8013

[21] Appl. No.: 270,438

[22] Filed: Jul. 5, 1994

[51] Int. Cl.[6] .................................................. B60P 1/50
[52] U.S. Cl. ........................ 414/501; 414/460; 414/486; 414/551; 414/555
[58] Field of Search ............................... 414/408, 434–6, 414/486–8, 501–2, 460, 551, 553–4, 555, 789.7; 56/328.1

[56]               References Cited

U.S. PATENT DOCUMENTS

| 2,824,655 | 2/1958 | Harbers | 414/486 |
|---|---|---|---|
| 3,282,998 | 10/1966 | Stevens | 414/459 |
| 3,432,053 | 3/1969 | Vereschagin | 414/501 |
| 3,447,705 | 6/1969 | Stone | 414/408 |
| 3,539,067 | 11/1970 | Secrist et al. | 414/789.7 X |
| 3,666,126 | 5/1972 | Rempel | 414/408 |
| 3,861,535 | 1/1975 | Huxley, III et al. | 414/460 X |
| 4,072,241 | 2/1978 | Parker et al. | 414/460 X |
| 4,103,794 | 8/1978 | Shaw | 414/551 X |
| 4,952,111 | 8/1990 | Callahan | 414/486 X |
| 5,187,927 | 2/1993 | McKenna, Jr. et al. | 56/328.1 |
| 5,320,472 | 6/1994 | Matlack et al. | 414/486 X |

FOREIGN PATENT DOCUMENTS

| 2376613 | 9/1978 | France | 414/501 |
|---|---|---|---|

*Primary Examiner*—James W. Keenan
*Attorney, Agent, or Firm*—David Kiewit

[57]               ABSTRACT

The invention provides a center-line loading harvester that can: 1) drive up to a filled fruit picker's tub; 2) lift the tub and transfer its contents to a hopper from whence a conveyor moves the fruit to a larger dump bin; 3) place the tub back on the ground; and 4) drive over the tub without damaging it or moving it appreciably from a desired location at which it was "spotted". The apparatus of the invention also provides a tub-holding magazine on the harvester that can both: 1) pick empty tubs off the ground and store them in a stack; and 2) take empty tubs from a stack and spot them on the ground.

11 Claims, 6 Drawing Sheets

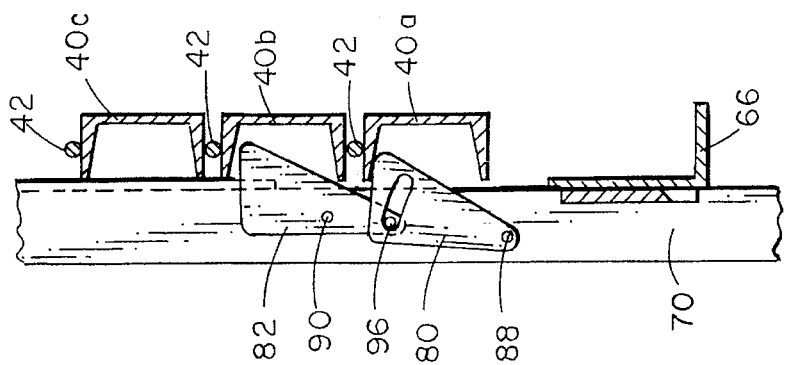
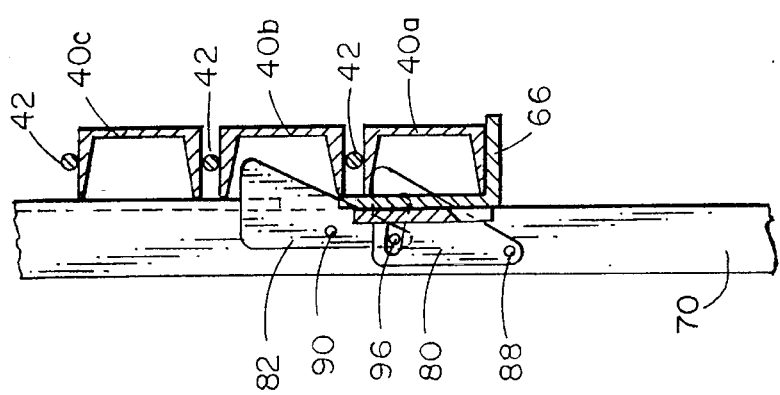
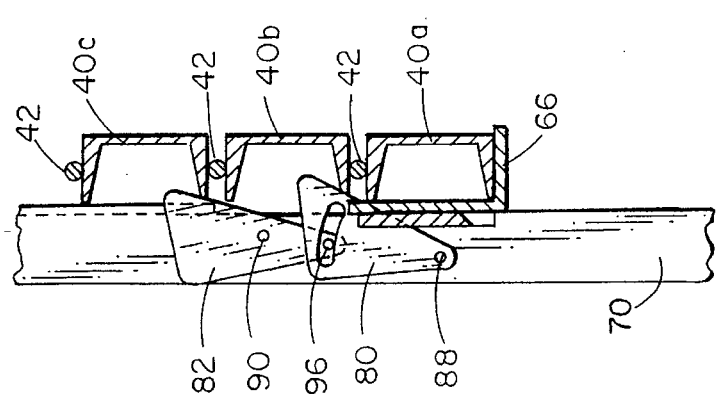
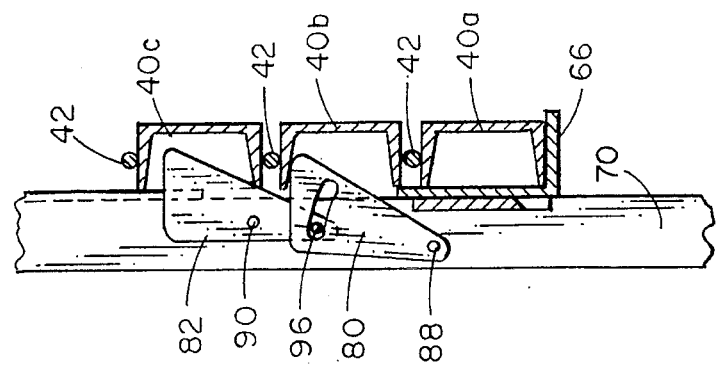

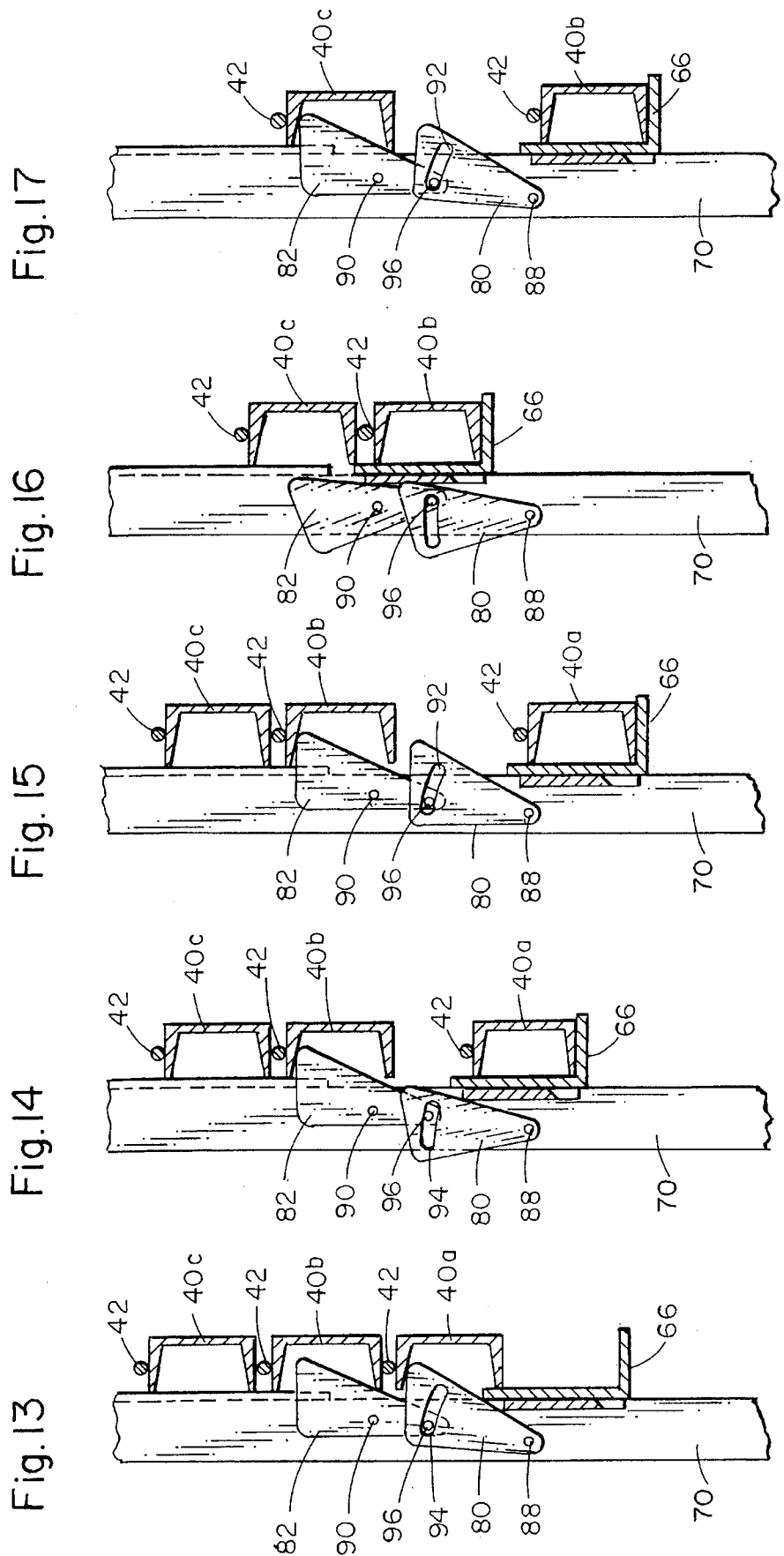

CENTER-LOADING HARVESTER

BACKGROUND OF THE INVENTION

It is conventional in the citrus industry for pickers to empty pick-sacks into a tub or bin placed near the trees being picked. A harvesting implement is driven between the rows of trees and is stopped next to a filled tub. The implement operator uses an articulated mechanical arm to pick up the filled tub and to dump it into a dump bin that is subsequently emptied into an on-road truck for transfer to a processing plant.

In order to maximize the number of producing trees in a grove, citrus growers commonly plant trees in "hedges" made up of rows of trees separated by narrow aisles or "drive middles" that allow access by various agricultural implements such as sprayers, hedge trimmers, and harvesters. The width of such drive middles is currently limited by the size of the harvester and tubs. The harvesting vehicle is commonly about seven feet wide and carries an articulated crane arm that swings some three feet to one side. The tub, which is conventionally a round pan-like plastic container with frusto-conoidal sides and a reinforcing rim of nominal three inch channel iron topped with a hoop made of one-half inch steel rod, is usually five feet in diameter. Thus, the grower must either provide aisles at least fifteen feet wide, or accept damage to the trees caused when the harvester operator drives into or swings an articulated arm into tree branches when picking up a full tub or when dropping off an empty one.

In additional to damaging trees, conventional harvesters also pose a safety hazard to both pickers and implement operators. If a tub is bumped against a tree or against a side of the implement while being handled, it can fall and cause injury. Since the usual one hundred pound tub holds a nominal nine hundred pounds of fruit, the potential for damage and severe injury is high.

Because of the awkwardness of present harvesters, it is conventional practice in the citrus industry to manually move emptied tubs from one aisle to the next. Moving a heavy tub can injure a worker, and rolling the relatively sharp edges of the tub rail over irrigation hoses can sever the hoses and cause a subsequent loss of water and expense of repair.

Fruit harvesters are represented in the prior art by:

McKenna et al, in U.S. Pat. No. 5,187,927, who teach an articulated vehicle with a tray receiving means on the front end thereof, a dump bin on the aft end thereof, and a conveyor means for moving picked fruit from the tray to the bin.

Rempel, in U.S. Pat. No. 3,666,126, who teaches a harvesting implement comprising two lifting mechanisms used to pick up filled containers of fruit or other produce, to dump those containers in a dump bin, and to stack the emptied tubs. Rempel's dump bin is subsequently elevated to transfer the produce to a truck or other vehicle.

Rempel, in U.S. Pat. No. 3,633,336, who teaches a tub stacking mechanism used on a fruit harvester.

Phillips, in U.S. Pat. No. 3,450,436, who teaches a high-lift side dump mechanism.

SUMMARY OF THE INVENTION

The invention provides a center-line loading harvester that can: 1) drive up to a filled fruit picker's tub; 2) lift the tub and transfer its contents to a hopper from whence a conveyor moves the fruit to a larger dump bin; 3) place the tub back on the ground; and 4) drive over the tub without damaging it or moving it appreciably from a desired location at which it was "spotted". The apparatus of the invention also provides a tub-holding magazine on the harvester that can both: 1) pick empty tubs off the ground and store them in a stack; and 2) take empty tubs from a stack and spot them on the ground.

It is an object of the invention to provide harvesting apparatus operable within a drive-middle no wider than the harvesting apparatus itself.

It is a further object of the invention to provide harvesting apparatus that allows a grower to plant trees closer together than has heretofore been practical, and to harvest fruit from closely planted trees without damaging the branches thereof.

It is an additional object of the invention to improve the safety of fruit-picking by obviating any need to swing heavily loaded tubs on crane-like articulated arms.

It is an object of the invention to improve the efficiency of fruit harvesting by both reducing the time required to empty a filled tub and by ensuring that the emptied tub is spotted on the ground at the most efficient location (e.g., equidistant from four trees).

It is yet an additional object of the invention to reduce irrigation water loss by the provision of an efficient tub-spotting mechanism that obviates the need to roll an empty fruit or vegetable tub across irrigation lines.

DESCRIPTION OF THE DRAWING

FIG. 8 of the drawing is a sectional view along line 8—8 of FIG. 2 showing two sliding dogs in the first of a sequence of positions that occur when a tub is raised onto the stack.

FIG. 9 of the drawing is a sectional view along line 8—8 of FIG. 2 showing two sliding dogs in the second of a sequence of positions that occur when a tub is raised onto the stack.

FIG. 10 of the drawing is a sectional view along line 8—8 of FIG. 2 showing two sliding dogs in the third of a sequence of positions that occur when a tub is raised onto the stack.

FIG. 11 of the drawing is a sectional view along line 8—8 of FIG. 2 showing two sliding dogs in the fourth and last of a sequence of positions that occur when a tub is raised onto the stack and the rim holder is lowered into position to operatively engage another tub.

FIG. 12 shows portions of the mechanism that was omitted from FIGS. 6 and 7 in the interest of clarity of presentation.

FIG. 13 of the drawing shows a rim holder in an initial position as it is raised to strip the bottom-most tub off a tub stack.

FIG. 14 of the drawing shows a subsequent step in the tub-destacking process in which the rim holder has tripped a bottom dog and released the bottom-most tub.

FIG. 15 of the drawing shows the rim holder retaining the rim of the bottom-most tub after stripping it from the tub stack and before that tub has been released by the rear gate.

FIG. 16 of the drawing shows the rim holder rising to strip a second tub from the tub stack.

FIG. 17 of the drawing shows the rim holder retaining the rim of the tub that had originally been the second tub from the bottom of the stack, and the upper dog retaining another tub.

DETAILED DESCRIPTION

Figure 1:
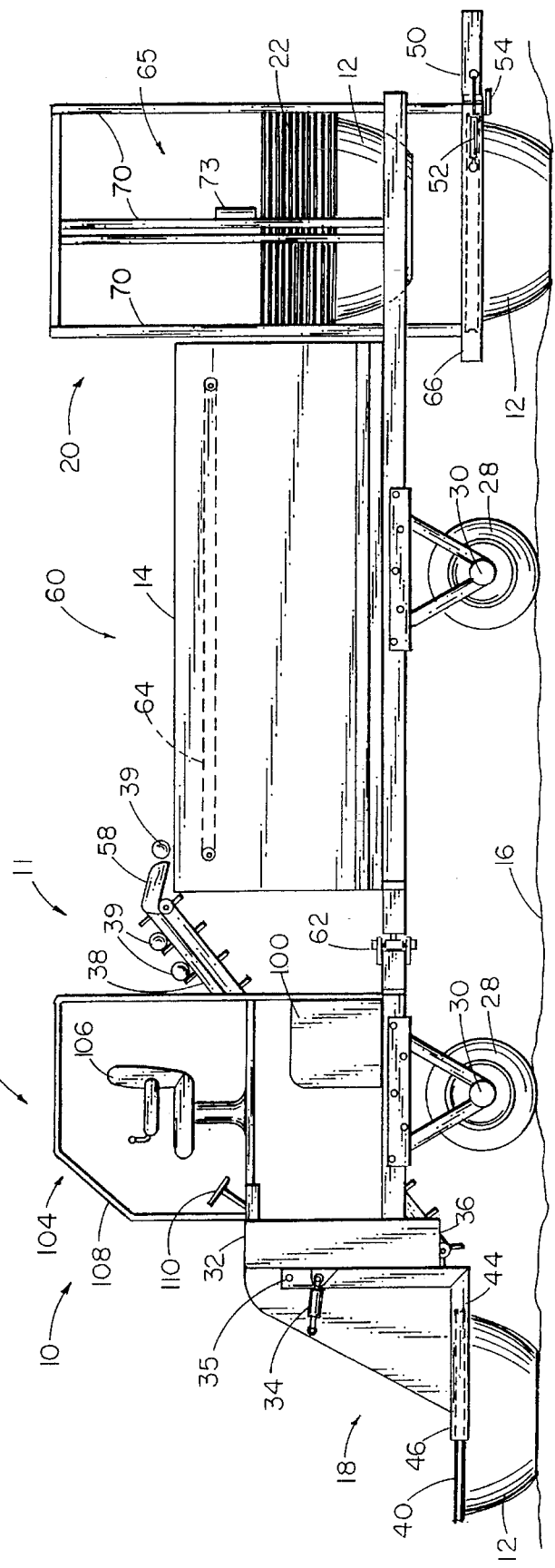
FIG. 1 of the drawing is a left side elevational view of a harvester of the invention.

Turning now to FIG. 1 of the drawing, one finds a self-propelled agricultural implement of the invention 10 usable in harvesting operations to pick up a produce-filled tub 12, transfer the fruit or vegetables in the tub 12 to a dump bin 14, and replace the emptied tub 12 on the ground 16. The implement 10 is intended for off-road use only, and therefore comprises a conventional mechanism for dumping the contents of a filled dump bin 14 into another container (e.g., the load bed of semi-trailer) that is used to carry the contents to a processing plant. Although this detailed description will refer to a harvester 10 designed specifically for the harvest of oranges to be processed into juice (and that may therefore be handled rather roughly), it will be understood to those skilled in the art that slightly altered versions of the same implement 10 can be used for other crops grown on plants raised in plantation rows separated by aisles. Such alterations might require accommodation, for example, to differing sizes of picker's tubs 12 and aisle widths that are employed with different varieties of agricultural produce.

The preferred implement 10 includes a tub catcher 18 at the front end of vehicle 11 and a tub stacker 20 at the rear end thereof. As will subsequently be discussed herein, the implement 10 can be driven into operative contact with a filled tub 12 (hereinafter called "catching the tub") that is to be emptied, or, if the catcher 18 is elevated, the implement 10 can be driven over the tub 12 without moving it from a desired position in which it was earlier "spotted". Correspondingly, as will also be disclosed in detail herein, the stacker 20 can be used to pick up an empty tub 12 and add it to a stack 22 of twenty or so tubs; to place an empty tub 12 on the ground 16 for the pickers' use; or to pass over a tub 12 without operatively interacting with it.

The harvester 10 is a center-line loader that loads produce from tubs 12 selectively spotted on the midline of an aisle 24 between adjacent rows of trees 26. Since none of the loading operations involve moving anything beyond the lateral extent of the implement 10, the aisle width (shown as W in FIG. 2 of the drawing) need be no greater than the width of the implement 10. To allow the vehicle 11 to pass over a tub 12, the track width of its wheels 28 (shown in phantom in FIG. 2 of the drawing) and the vertical ground clearance of the vehicle 11 are both chosen to be great enough to avoid interference. In a preferred embodiment, the wheels 28 are mounted on stub axles driven by hydraulic motors 30 so that there are no solid axles extending across the vehicle 11. This use of hydraulic motors 30 is well established in the field of agricultural implements, but it will be understood to those skilled in the art that other approaches could be used. These approaches include the use of electric motors powered by an on-board generator, or by a conventional combination of an internal combustion engine and a mechanical drive that has all the elements of the power-train far enough off the ground 16 to be out of the way of the tub 12.

Figure 2:
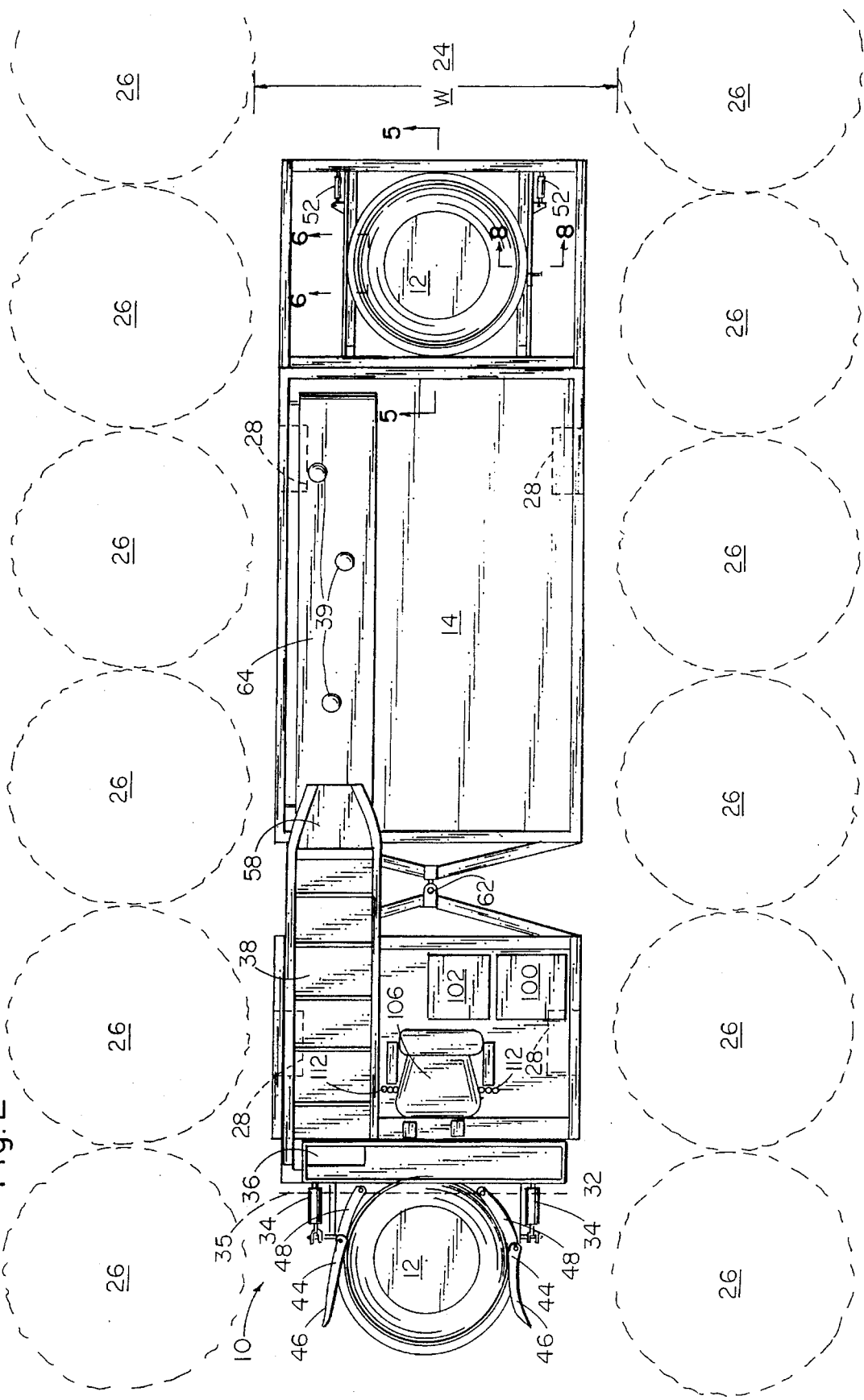
FIG. 2 of the drawing is a top plan view of the harvester showing an emptied tub being released by the front gate of the tub catcher.
Figure 3:
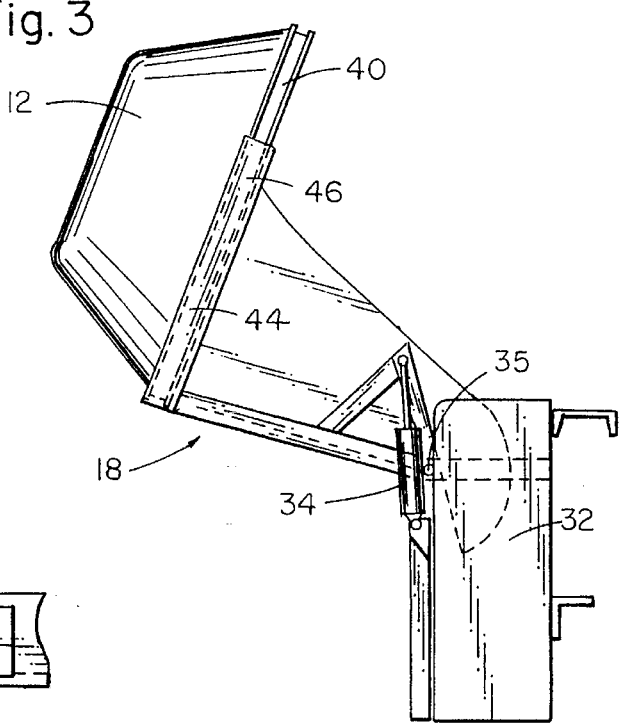
FIG. 3 of the drawing is a left side elevational view of a portion of the implement showing the tub catcher in a raised and tilted position for transfer of fruit to a hopper.

Turning now to FIG. 3 of the drawing, one finds a tub catcher 18 holding a caught tub 12 in an elevated position to transfer the contents of the tub 12 to a hopper 32 by using a double acting cylinder 34 to pivot the tub catcher 18 about a fixed horizontal axis 35 (indicated in phantom in FIG. 2 of the drawing) extending across the front of the vehicle 11. The axis 35 is conveniently situated about five and one half feet off the ground 16, which raises the bottom of the tub catcher 18 high enough off the ground 16 that the catcher 18 clears any tub 12 that the vehicle 11 is driven over. The hopper 32 preferably has a front face (not shown) made of spaced apart rods or relatively open grillwork to allow stems, leaves, sand and other debris to be sifted out. Fruit transferred to the hopper 32 is gravity-fed, via a hole 36 in the bottom of the hopper 32 to a cleated conveyor 38.

The relatively simple rotational mechanism of the tub catcher 18 is adequate for use in loading juice oranges 39 because of industry standards on the size and configuration of the tubs 12. A conventional ten field box tub 12 has a reinforced rim 40 made of three-inch channel iron topped with a hoop 42 made of one-half inch diameter steel rod. The top of the rim 40 is twenty-five inches off the ground 16. In order to pick up such a tub 12, the tub catcher 18 is made with a tub catcher rail 44 that is six inches high and that is attached to the implement 10 so that the generally horizontal top of the rail 44 is twenty-seven inches off the ground 16. The rail 44 may have an outwardly bent lead-in portion 46, as shown in FIG. 2 of the drawing. This choice of dimensions is adequate to ensure that the tub catcher 18 either reliably catches a tub 12, or alternately, is raised far enough off the ground 16 to clear any tub 12 that the operator chooses to pass over. It will be understood to those skilled in the art that other, more complex, tub handling arrangements—e.g., one incorporating a front end fork with separate lifting and dumping motions—could also be employed.

Figure 4:
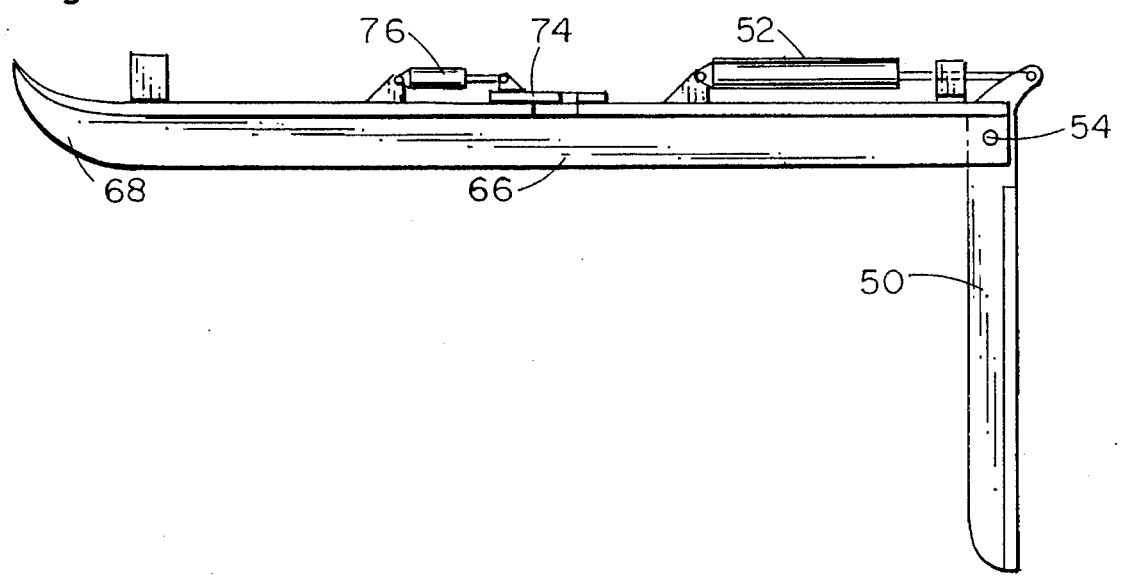
FIG. 4 of the drawing is a partial top view of a rim holder and rear gate used in the stacker portion of the implement.

The preferred tub catcher 18 incorporates a hydraulically actuated gate 48 (hereinafter called the "front gate" to distinguish it from a rear gate 50 at the rear of the implement 10, which is shown in FIGS. 1 and 4 of the drawing). Both gates operate in essentially the same way for similar functions. A double acting hydraulic cylinder 52 is used to either close a gate 48, 50 (in which position the movable gate element is rotated about a gate hinge 54 to be transverse to the axis of the implement 10); or to open a gate 48, 50 by rotating it about the hinge 54 so that the gate 48, 50 does not contact a tub 12 as the implement 10 passes over it. As shown in FIG. 2 of the drawing, the front gate 48 has begun to open so that the emptied tub 12 can escape the tub catcher 18 and be straddled by the moving vehicle 11. It will be understood that the implement 10 can also be operated without a front gate 48, in which case an emptied tub 12 would be put back on the ground 16, the implement 10 would be put into reverse and backed away from the tub 10, the tub catcher 18 would be rotated upwardly (e.g., as seen in FIG. 3), and the implement would then be driven over the tub 12.

As previously noted, oranges 39 pass from the hopper 32 to a cleated conveyor 38 rigidly fixed to the front, tractor, portion 56 of the implement 10 and are carried upwardly and aft to a chute 58 extending over the dump bin 14. In the preferred embodiment the dump bin 14 is mounted to a rear, trailer portion 60, of the implement 10. Since the tractor 56 and trailer 60 portions of the implement 10 are preferably attached at a pivotal joint 62 to form a more easily steered articulated vehicle, it is clear that the conveyor 38 and chute 58 must extend aft far enough so that oranges 39 are properly dropped into the dump bin 14 even if the articulating joint 62 is sharply flexed.

Oranges 39 drop from the chute 58 onto a second, flat-belt conveyor 64 that moves them to the rear of the dump bin 14. When the rear of the bin 14 has filled, oranges 39 are pushed off the belt 64 at relatively more forward positions so that the bin 14 is evenly filled. When the dump bin 14 is filled, the implement 10 is commonly driven next to an on-road truck, the dump bin 14 is raised with a hydraulically operated scissors-jack arrangement and is then dumped into the truck, as taught by Phillips in U.S. Pat. No. 3,450,436, or by Rempel in U.S. Pat. No. 3,666,126. The disclosures of U.S. Pat. No. 3,666,126, and U.S. Pat. No. 3,450,436 are herein incorporated by reference.

The implement 10 can also be used to pick up emptied tubs 12 that the vehicle portion 11 of the harvester 10 has straddled and driven over (hereinafter "straddled" tubs), or to spot empty tubs 12 from a tub stack 22 at selected locations in an aisle 24 intermediate plantation rows of trees 26 that are to be picked. A preferred stacker 20 is located at the rear of the implement 10 and comprises a magazine 65 having an internal diameter greater than the standard diameter of the tub and comprising a plurality of vertical support members 70. A magazine 65 may hold a stack of up to twenty tubs that can be lowered, one at a time, under the influence of gravity by a mechanism that will be discussed subsequently herein. A tub 12 can ride on a rim holder 66 that can be lowered so that the tub 12 is dragging on the ground 16. From this position the tub can be released at a selected instant as the implement 10 drives along an aisle 24 by opening the rear gate 50 and driving away from the tub 12. This is an improvement over current practice as there is no risk of cutting irrigation lines when manually rolling a tub from one drive middle to the next and there is no swinging articulated arm to damage branches. It will be understood that although the rear gate 50 is shown in the drawing as being an outwardly swinging gate pivoting about a vertically disposed hinge 54, many other known arrangements (e.g., an 'overhead door' that pivots about a horizontal hinge) could be used to provide the same function.

The same stacker mechanism 20 is employed to pick up an empty tub 12 that has been straddled by the vehicle 11 and engaged by the lead-in portions 68 of the rim holder 66. As previously discussed with regard to the tub catcher 18, an appropriate choice of dimensions and mounting height of the rim holder 66 ensures reliable capture of the tub 12 as long as the rear gate 50 is closed. If, on the other hand, the operator chooses to bypass a tub, the gate 50 can be left open (e.g., as shown in FIG. 1) and the implement 10 driven over the tub 12. In this case, the tub 12 is engaged by the rim holder 66, but friction between the tub 12 and the ground 16 is adequate to ensure that the tub 12 is neither picked up nor moved an appreciable distance from its prior location.

Figure 6:
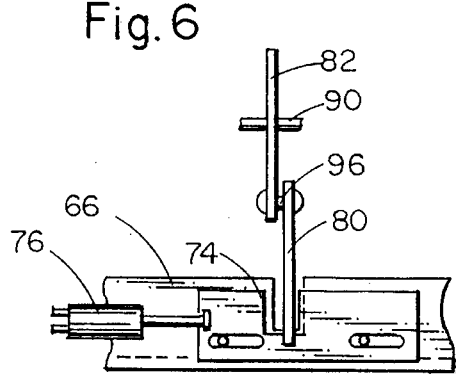
FIG. 6 of the drawing is a partial sectional view, taken along lines 6—6 in FIG. 2, of a dog tripper in an open position for raising and stacking tubs. Bias springs and other detail relating to the sliding dogs have been omitted from FIGS. 6 and 7, and are shown in FIG. 12.

The rim holder 66 is attached to vertical sliding supports 71 that slide within vertical tubular members 72 and that are driven up and down by a double acting hydraulic cylinder 73. Cycling the rim holder 66 up and down serves to either lift a tub 12 onto the bottom of the stack 22, or to strip the bottom-most tub 12 off the stack 22, depending on how the operator has set a dog tripper 74 that is attached to the tub rail 66. The dog tripper 74 is moved fore and aft by a double acting hydraulic cylinder 76 that moves it between an open position (shown in FIG. 6) used to raise and stack tubs 12, and a closed position (shown in FIG. 7) used to strip the bottom-most tub 12 from the stack 22.

Turning now to FIGS. 8–11 of the drawing, one finds a sequence of stages in the raising of a tub (of which only the rim 40 and rim hoop 42 are shown, in the interest of clarity). In FIG. 8 the rim holder 66 has been raised to a position in which the rim hoop 42a on the bottom-most tub 12 has just come into contact with the bottom of the rim 40b of the second lowest tub 12. In this position, both the lower, slotted, dog 80 and the upper dog 82 are biased into their rotational resting positions by bias springs 84, 86, respectively. As the rim holder 66 moves higher (e.g., the view of FIG. 9), the rims 40 cause the lower 80 and upper 82 dogs to pivot about their mounting pins (88, 90, respectively). At a still higher portion of the vertical travel of the rim holder 66 (e.g., the view of FIG. 10) neither the rims 40 nor the dog tripper 74 (which is "open") are in contact with the dogs 80, 82, so the dogs 80, 82 return to their inward resting position under the influence of the bias springs 84, 86. At its inward resting position, each dog 80,82 extends beneath the rims 40 of all the tubs above it, and can thus be used to hold a tub or tubs 12 in the stack 22. When the rim holder 66 is subsequently lowered (e.g., the view of FIG. 11), the bottom-most tub rim 40a is suspended by the lower dog 80 and the stack 22 has been incremented by one tub 12.

Figure 7:
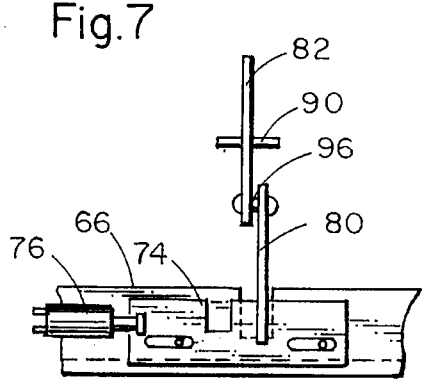
FIG. 7 of the drawing is the same sectional view as FIG. 6, save that the dog tripper is in a closed position for lowering a tub from the stack.
Figure 12:
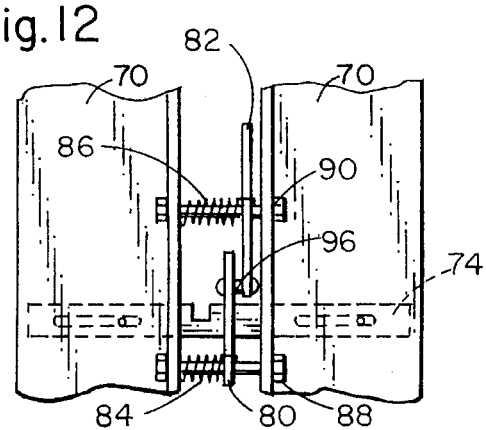
FIG. 12 of the drawing is a partial sectional view, taken from outside the implement in a direction opposite to that used for FIGS. 6 and 7.
Figure 5:
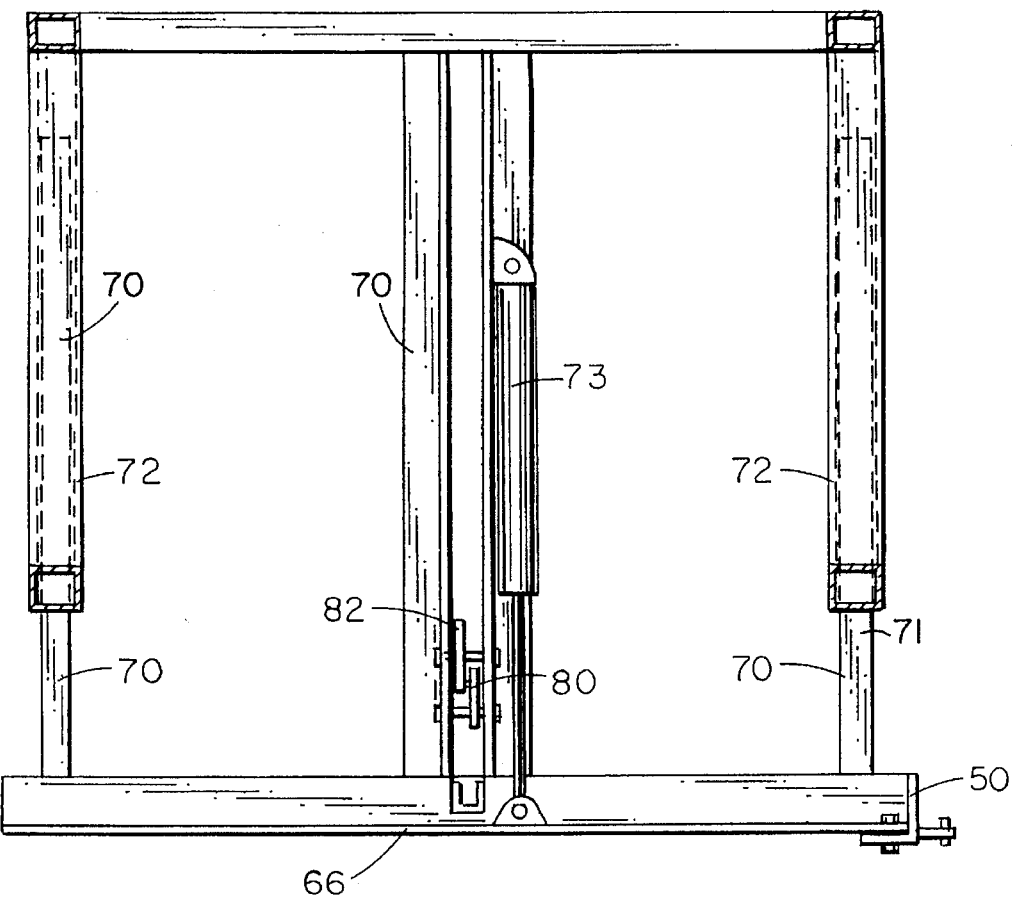
FIG. 5 of the drawing is a side sectional view of a portion of the stacker mechanism. This view is taken from the inside of the mechanism, as indicated by the line 5—5 in FIG. 2.

Conversely, if the dog tripper 74 is "closed", as shown in FIG. 7, then the dog tripper 74 will act on the lower spring-biased dog 80 to cause a tub 12 to drop off the bottom of the stack 22, as is shown in FIGS. 13–15 of the drawing. In FIG. 13 of the drawing, the empty rim holder 66 has been raised into initial contact with the dogs 80, 82—i.e., into an initial position similar to that of FIG. 8. Raising the rim holder 66 further (e.g., the view of FIG. 14) causes the dog tripper 74 to bear on the bottom dog 80 and to rotate it away from the bottom-most rim 40a, which releases the bottom-most tub 40a from the dog 80 and allows it to be retained by the rim holder 66. As the bottom dog 80 moves to its extreme position, as shown in FIG. 14, the innermost end 92 of a slot 94 engages a linking pin 96 that links the two dogs 80, 82. Thus, the force of the tripper 74 is applied via the linking pin 96 to rotate the top of the upper dog 82 inwards and thereby ensure a positive support for the rim 40b that is second from the bottom. In this case, when the rim holder 66 is again lowered (e.g., the view of FIG. 15) the bottom-most tub (e.g. rim 40a) has been stripped from the stack 22 and the stack 22 has been decremented by one tub.

After the bottom-most tub (e.g., rim 40a), which was supported by the bottom dog 80, has been stripped off the stack 22, the rest of the tubs 12 in the stack 22 are supported by the upper dog 82, as seen in FIG. 15. Turning now to FIGS. 16 and 17 of the drawing, one sees an intermediate step (FIG. 16) and an end step (e.g., FIG. 17) in the operation of stripping an additional tub (in this case shown by the rim 40b that had been second from the bottom in FIG. 13).

In a preferred embodiment of the invention, the vehicle 11 and all of the operations performed by various actuators on the implement 10 are powered by a single internal combustion engine 100 that drives a hydraulic pump or pumps 102. In a prototype version of the implement 10, a sixteen horsepower Otto cycle engine was used. It is expected that a full-scale citrus-handling implement 10 will use about a forty horsepower diesel engine. In the prototype implement 10, the hydraulic pump is a single unit, but it is expected that a full-scale implement 10 will use a tandem pump arrangement in which a first pump powers the hydraulic drive motors 30 and the second pump of the pair powers the remaining actuators. The use of tandem pumps is expected to avoid problems with pump starvation that can occur under some operating conditions.

The operations of the harvester 10 are preferably controlled from a single operating location 104 which preferably includes a swiveling seat 106 and which may include a metal mesh housing 108 to keep branches from hitting the operator. The swiveling seat 106 allows the operator to look aft at the load in the dump bin 14 and to view the status of the stack 22 via a known fresnel lens or mirror arrangement (not shown). A pair of foot pedals 110 preferably modulate reversing proportional control valves to control forward and reverse motion of the implement 10 and to provide steering. Steering is provided, as is known in a variety of such equipments, by using one of the pedals 110 to control hydraulic fluid flow to the left front and right rear wheel motors 30 and by using the other of the pedals 110 to control fluid flow to the other two wheels. The other hydraulic controls 112 may be conveniently located in an array on the arms of the operator's seat 106 and comprise a set of six control valves. Tests on the prototype implement 10 indicate that the selection of which control valve is located at which position is a matter of arbitrary choice. The on/off and throttle setting for the engine 100, which is expected to be run at a fairly constant speed and therefore require few resettings, are also preferably configured as hand controls set in convenient proximity to the operator's seat 106.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is desired to be secured by Letters Patent is:

I claim:

1. In a self-propelled harvester comprising a vehicle having a front end, a rear end and a longitudinal axis, an improvement comprising a tub catcher attached to the vehicle adjacent the front end thereof, the tub catcher comprising:

two tub catcher rails spaced apart on opposite sides of the longitudinal axis by a first distance equal to a predetermined diameter of a tub;

means for raising the tub catcher rails from a horizontal lowered position, wherein the tub is engaged intermediate the tub catcher rails, to a raised position;

the tub catcher further comprising a front gate adjacent a rear end of one of the tub catcher rails, the front gate comprising a moveable front gate element pivoting about a front gate hinge between a closed position wherein the moveable front gate element retains the engaged tub intermediate the tub catcher rails when in the lowered position, and an open position wherein the moveable front gate element does not retain the engaged tub intermediate the tub catcher rails when in the lowered position.

2. In the harvester of claim 1 a further improvement comprising a tub stacker adjacent the rear end of the vehicle, the tub stacker comprising:

a magazine comprising a plurality of vertical support members;

a pair of horizontal tub stacker rails spaced apart on opposite sides of the longitudinal axis by the first distance;

a second, rear, gate adjacent a rear end of one of the tub stacker rails, the rear gate comprising a moveable rear gate element and a rear gate hinge, the moveable rear gate element pivoting about the rear gate hinge between a closed position wherein the moveable rear gate element retains the tub intermediate the tub stacker rails, and an open position wherein the moveable rear gate element does not retain the tub intermediate the tub stacker rails;

lifting means for lifting the tub stacker rails into a raised position; and latching means extending inward of at least one of the vertical support members.

3. The harvester of claim 2 wherein the latching means comprises a plurality of dogs, each of the dogs pivotally attached to a respective vertical support member and urged outward thereof by a rim of the retained tub when the tub stacker rail is lifted, each of the dogs otherwise biased inwards of its respective vertical support member by a bias spring into a latching position.

4. The harvester of claim 2 wherein the latching means comprises a plurality of pairs of dogs, each of the dogs biased inwards of a respective one of the vertical support members by a bias spring, each of the pairs of dogs further comprising an upper dog and a lower dog, the tub stacker further comprising tub-removing means comprising a plurality of dog trippers, each of the dog trippers moving between an open position wherein the open dog tripper does not abut a respective lower dog, and a closed position wherein the closed dog tripper abuts the respective lower dog and retains the lower dog outward of its respective support member.

5. In a self-propelled harvester comprising a vehicle having a front end, a rear end, and a longitudinal axis, the harvester comprising transversely paired wheels spaced apart by a distance greater than a predetermined diameter common to each of a plurality of tubs, the harvester picking up a loaded tub of the plurality of tubs, the harvester transferring agricultural produce from the loaded tub to the vehicle, an improvement comprising a tub stacker adjacent the rear end of the vehicle, the tub stacker comprising:

a magazine comprising a plurality of vertical support members;

a pair of horizontal tub stacker rails spaced apart on opposite sides of the longitudinal axis by the predetermined diameter, whereby the tub stacker rails engage one of the tubs therebetween;

a rear gate adjacent a rear end of one of the tub stacker rails, the rear gate comprising a moveable rear gate element and a rear gate hinge, the moveable rear gate element pivoting about the rear gate hinge between a closed position wherein the moveable rear gate element retains the engaged tub between the tub stacker rails and an open position wherein the moveable rear gate element does not retain the engaged tub between the tub stacker rails;

lifting means for lifting the tub stacker rails into a raised position; and latching means extending inward of at least one of the vertical support members.

6. The harvester of claim 5 wherein the latching means comprises a plurality of dogs, each of the dogs pivotally attached to a vertical support member and biased inwards thereof by a bias spring into a latching position wherein the dog extends beneath a rim of any of the plurality of tubs disposed above the dog in the magazine.

7. The harvester of claim 5 wherein the latching means comprises a plurality of pairs of dogs biased inwards of respective vertical support members by bias springs into resting postions wherein each dog extends beneath a rim of any of the tubs disposed above the dog in the magazine, each of the pairs of dogs further comprising an upper dog and a lower dog, and wherein the tub stacker further comprises tub-removing means comprising a plurality of dog trippers, each dog tripper moving between an open and a closed position, each dog tripper in its closed position abutting a respective lower dog and urging the lower dog outward of its respective support member, each dog tripper in its open position not abutting the respective lower dog.

8. The harvester of claim 5 further comprising a tub catcher adjacent the front of the vehicle, the tub catcher comprising two tub catcher rails transversely spaced apart on opposite sides of the longitudinal axis by the predetermined diameter, the tub catcher further comprising means for raising the tub catcher rails from a horizontal position wherein the tub catcher engages a rim of the loaded tub and a raised position wherein agricultural produce moves under the influence of gravity from the raised loaded tub into a hopper disposed on the vehicle adjacent the front end thereof.

9. Apparatus handling agricultural produce harvesting tubs, each of the tubs having a predetermined diameter, each of the tubs comprising a rim adjacent a top edge thereof, the apparatus comprising:

a self-propelled vehicle having a front end, a rear end, and a longitudinal axis, the vehicle comprising transversely paired wheels spaced apart from each other by more than the predetermined diameter;

a tub catcher adjacent the front end of the vehicle, the tub catcher comprising a pair of tub catcher rails parallel to the sides of the vehicle and spaced apart from each other on opposite sides of the longitudinal axis by the predetermined diameter, the tub catcher further comprising a front gate adjacent a rear end of one of the tub catcher rails, the front gate comprising a moveable front gate element and a front gate hinge, the moveable front gate element pivoting about the front gate hinge between a closed position wherein the moveable front gate element retains a tub intermediate the tub catcher rails and an open position wherein the moveable front gate element does not retain a tub intermediate the tub catcher rails; and a tub stacker adjacent the rear end of the vehicle, the tub stacker comprising a magazine comprising a plurality of vertical support members, a pair of horizontal tub stacker rails spaced apart from each other on opposite sides of the longitudinal axis by the predetermined diameter, a rear gate comprising a moveable rear gate element adjacent a rear end of one of the tub stacker rails, the rear gate element pivoting about a rear gate hinge between a closed position wherein the moveable rear gate element retains one of the tubs intermediate the tub stacker rails and an open position wherein the moveable rear gate element does not retain one of the tubs intermediate the tub stacker rails, lifting means for lifting the tub stacker rails into a raised position, and latching means extending inward of at least one of the vertical support members.

10. Apparatus of claim 9 wherein the latching means comprises a plurality of dogs, each of the dogs pivotally attached to a vertical support member and biased inwards thereof by a bias spring into a latching position wherein the dog extends beneath the rim of any of the tubs disposed above the dog in the magazine.

11. Apparatus of claim 9 wherein the latching means comprises a plurality of pairs of dogs pivotally attached to respective vertical support members, each of the dogs biased inwards of a respective vertical support member by a respective bias spring, each of the pairs of dogs further comprising an upper dog and a lower dog, and wherein the tub stacker further comprises tub-removing means comprising a plurality of dog trippers, each dog tripper moving between an open and a closed position, each closed dog tripper abutting a respective lower dog and urging the respective lower dog outward of the respective support member, each dog tripper in its open position not abutting the respective lower dog.

* * * * *